US009911247B1

(12) United States Patent
Mishmash et al.

(10) Patent No.: US 9,911,247 B1
(45) Date of Patent: Mar. 6, 2018

(54) AIRCRAFT REQUIREMENTS PRESENTATION SYSTEM, DEVICE, AND METHOD

(71) Applicant: Rockwell Collins, Inc., Cedar Rapids, IA (US)

(72) Inventors: Brian E. Mishmash, Atkins, IA (US); Colin D. Reed, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 79 days.

(21) Appl. No.: 15/250,691

(22) Filed: Aug. 29, 2016

(51) Int. Cl.

| | |
|---|---|
| ***G01M 17/00*** | (2006.01) |
| ***G06F 7/00*** | (2006.01) |
| ***G06F 11/30*** | (2006.01) |
| ***G06F 19/00*** | (2018.01) |
| ***G07C 5/00*** | (2006.01) |
| ***G08G 5/00*** | (2006.01) |
| ***G07C 5/06*** | (2006.01) |

(52) U.S. Cl.
CPC ............... *G07C 5/006* (2013.01); *G07C 5/06* (2013.01); *G08G 5/0034* (2013.01)

(58) Field of Classification Search
CPC ......... G07C 5/006; G07C 5/06; G08G 5/0034
USPC ........................................................ 701/29.4
See application file for complete search history.

(56) References Cited

U.S. PATENT DOCUMENTS 6,020,831 A * 2/2000 Nishida ..................... G01S 7/22 340/945
6,246,341 B1 * 6/2001 Germanetti ............ B64D 43/00 340/945
6,408,258 B1 * 6/2002 Richer ................... G06Q 10/06 701/29.3
7,006,903 B2 * 2/2006 Smith .................. G08G 5/0043 244/1 R
8,126,597 B2 * 2/2012 Bailly ................ G05B 23/0283 701/29.4
8,452,475 B1 * 5/2013 West ...................... G07C 5/008 701/29.1
8,571,747 B2 * 10/2013 Zimpfer ................. G06Q 10/06 701/29.1
8,694,184 B1 * 4/2014 Boorman ............... G01C 23/00 340/945
9,043,051 B1 * 5/2015 Barber .................... B64C 19/00 701/11

(Continued)

*Primary Examiner* — Harry Y Oh
(74) *Attorney, Agent, or Firm* — Daniel M. Barbieri; Donna P. Suchy; Angel N. Gerdzhikov

(57) ABSTRACT

A system, device, and method for presenting aircraft requirements are disclosed. The aircraft requirements presentation system could include a source of maintenance data; an aircraft system(s); an input device; a processing unit (PU); and a display unit. The PU may be configured to acquire maintenance data; identify one or more schedule maintenance actions due at the present time; generate command data to a disable specific functionality of the aircraft system(s); provide the command data to the aircraft system(s); generate an image data set representative of one or more page images, whereon each page there may be image of at least one maintenance strip indicating a maintenance action and at least one a count for the maintenance action; and present the image(s) on the display unit. In some embodiments, a maintenance strip could include a graphical user interface through which a pilot may enable the disabled functionality.

20 Claims, 13 Drawing Sheets

(56) References Cited

U.S. PATENT DOCUMENTS

| | | | | |
|---|---|---|---|---|
| 9,251,502 | B2 * | 2/2016 | Schoonveld | G06Q 10/10 |
| 9,459,120 | B2 * | 10/2016 | Wischmeyer | G01C 23/005 |
| 9,620,021 | B1 * | 4/2017 | Barber | G08G 5/003 |
| 2001/0032110 | A1 * | 10/2001 | Sinex | G06Q 10/025 701/29.4 |
| 2007/0050104 | A1 * | 3/2007 | Wallace | B60T 7/14 701/31.4 |
| 2008/0147264 | A1 * | 6/2008 | Doulatshahi | G06Q 10/06 701/29.5 |
| 2009/0234616 | A1 * | 9/2009 | Perkins | G06Q 10/06 702/184 |
| 2010/0332054 | A1 * | 12/2010 | Brandao | G08G 5/0013 701/3 |
| 2012/0044092 | A1 * | 2/2012 | Shore | B64F 5/00 340/945 |
| 2015/0066285 | A1 * | 3/2015 | Albouy | G07C 5/006 701/29.3 |
| 2015/0356873 | A1 * | 12/2015 | Kneuper | G08G 5/0021 701/439 |
| 2016/0068280 | A1 * | 3/2016 | Buehler | B64F 5/0045 701/34.2 |

* cited by examiner

AIRCRAFT REQUIREMENTS PRESENTATION SYSTEM, DEVICE, AND METHOD

BACKGROUND

Prior to a flight, a pilot has numerous duties to perform. One of these pre-flight duties may include a review of both present and past discrepancies reported for the aircraft. Present discrepancies may be those reported but not yet repaired, and past discrepancies may be those reported and repaired. Most of these discrepancies are unplanned or unscheduled, and many of them are originated by pilots who discover the discrepancy. Because these type of discrepancies arise randomly, these may be considered unscheduled maintenance actions.

Scheduled maintenance actions may be those that do not arise randomly. Generally, aircraft maintenance actions may be scheduled in intervals measured by a number of hours or cycles, or by the calendar. Personnel other than pilots may be tasked with the monitoring or tracking of the number of hours, cycles, and/or days being accumulated by the aircraft. When the aircraft has arrived at an hour, cycle, and/or day applicable for a scheduled maintenance action, notice may be provided to aircraft maintenance personnel so that the action may be performed.

While a mechanic may receive notice, a pilot may not be made aware of an action(s) that is due now or due soon. If the pilot plans for a lengthy flight or a flight in which numerous take-offs and landings (i.e., cycles) are anticipated, a scheduled maintenance action may become past due inadvertently. If a scheduled maintenance action exceeds a limit of its interval, the aircraft may not be considered airworthy; even if it is safely flown, the pilot may be subjected to penalties levied by an aviation governing authority such as, in the United States, the Federal Aviation Authority (FAA).

SUMMARY

Embodiments of the inventive concepts disclosed herein are directed to a system, device, and method for presenting aircraft requirements. The aircraft requirements presentation system could enhance aircraft safety by presenting the pilot with the scheduled maintenance requirements of an aircraft prior to it being flown.

In one aspect, embodiments of the inventive concepts disclosed herein are directed to a system for presenting aircraft requirements. The system could include a source of maintenance data, an input device, one or more aircraft systems configured with specific operational functionality, a processing unit (PU), and a display unit.

In a further aspect, embodiments of the inventive concepts disclosed herein are directed to a device for presenting aircraft requirements. The device could include the PU configured to perform the method in the paragraph that follows.

In a further aspect, embodiments of the inventive concepts disclosed herein are directed to a method for presenting aircraft requirements. When properly configured, the PU may acquire maintenance data; identify one or more schedule maintenance actions due at the present time; generate command data to disable specific operational functionality of the one or more aircraft systems; provide the command data to the one or more aircraft systems; generate an image data set representative of one or more page images; and present the image(s) on the display unit. On each page, there may be an image of at least one maintenance strip indicating a maintenance action and at least one count of the maintenance action. In some embodiments, the maintenance strip could include a graphical user interface for receiving a pilot's action of enabling the disabled functionality via the input device.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
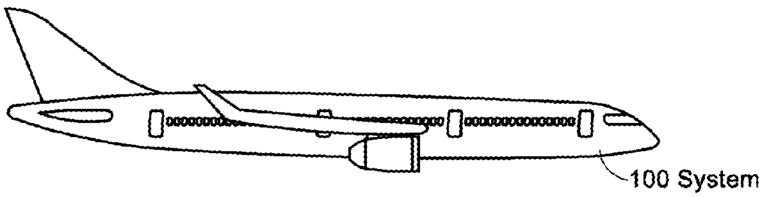
FIG. 1A depicts an aircraft configured with an aircraft requirements presentation system according to the inventive concepts disclosed herein.
Figure 1B:
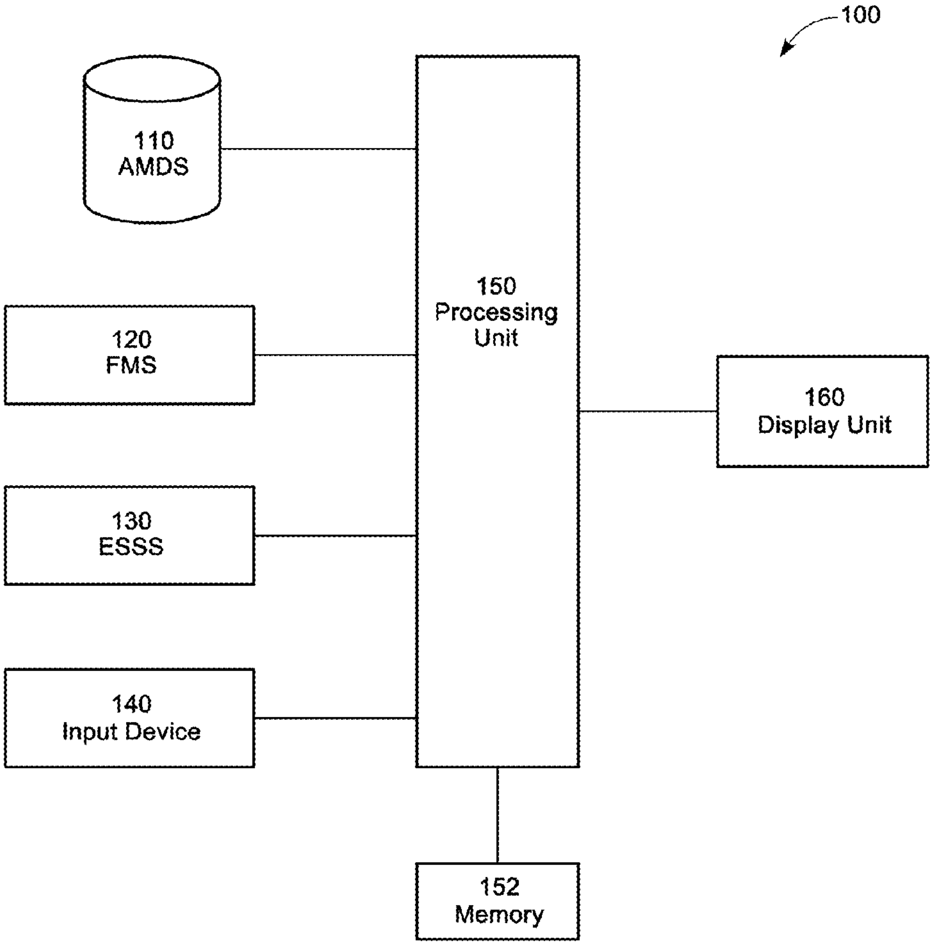
FIG. 1B depicts a functional block diagram of the aircraft requirements presentation system of FIG. 1A.

Referring now to FIGS. 1A-1B, an embodiment of an aircraft maintenance presentation system 100 suitable for implementation of the inventive concepts described herein includes a source of aircraft maintenance data (AMDS) 110, a flight management system (FMS) 120, an engine start sequence system (ESSS) 130, an input device 140, a processing unit (IG) 150, and a display unit 160.

The AMDS 110 could include any source(s) which maintains and/or provides scheduled and unscheduled maintenance information for one or more aircraft. In some embodiments, a manufacturer may provide a listing containing a schedule of maintenance actions which provide a listing containing a schedule of maintenance actions. In some embodiments, an owner and/or operator may schedule maintenance actions.

Typically, aircraft maintenance actions may be scheduled in intervals measured in units of hours, cycles, or calendar. Hours could be measured by a number of flight hours flown by the aircraft and/or number of engine hours which the engine of the aircraft is powered. Cycles could be measured by a number of flights, where a flight is defined as the operation of the aircraft take-off and landing. Calendar could be measured by a number of days, months, and/or years.

In some embodiments, scheduled maintenance may be performed within a range. In some embodiments, the range could be defined as a percentage or unit of the interval. For example, if measured as a percentage, a component having an interval of 500 flight hours could have a range of plus or minus ten percent (or plus or minus 50 flight hours), that is, a range between 550 and 450 flight hours, respectively; here, the maximum and minimum limits of the interval range could be 550 and 450 flight hours, respectively. As long as the maintenance action is performed within the hourly range, the maintenance action may be considered as being performed in accordance with the schedule. If the maintenance action exceeds the maximum limit, it may not be considered to be airworthy, jeopardizing an airworthiness certificate of the aircraft. In such a case, the pilot, aircraft owner, and/or aircraft operator may be subjected to penalties levied by an aviation governing authority such as, in the United States, the Federal Aviation Authority (FAA).

In some embodiments, the range may not allow for the interval to be exceeded. For example, if measured as a number of cycles, a component having an interval of 500 cycles could have a range of minus 25 cycles but a plus of 0 zero cycles; here, the maximum and minimum limits of the interval range could be 500 and 475 cycles, respectively. As long as the maintenance action is performed within the cyclic range, the maintenance action may be considered as being performed in accordance with the schedule.

Besides scheduled maintenance actions, unscheduled (synonymously, non-scheduled) maintenance actions may arise from time to time. For example, a component may become inoperative. In some embodiments, unscheduled maintenance actions may be reported by pilots as well as other flight crew. In some embodiments, unscheduled maintenance actions may be reported by aircraft mechanics as well as other aircraft maintenance technicians. In some embodiments, an interval and/or limit could be assigned to the unscheduled maintenance action, making the action a scheduled maintenance action.

In some embodiments, the unscheduled maintenance action may not be assigned an interval and/or limit, allowing the action to go unaddressed or unrepaired. An example of such action could be a matter of passenger convenience or comfort which may not affect the airworthiness of subsequent aircraft operations.

The FMS 120 could include any source(s) which provides navigation and/or navigation-related data information in an aircraft. The FMS 120 is known to those skilled in the art for performing a variety of functions designed to help a pilot with the management of the flight. In some embodiments, the FMS 120 could estimate a number of cycles for a flight plan and/or an amount of time needed to perform the flight plan. In some embodiments, the FMS 120 may provide data representative of the estimates to the PU 150. In some embodiments, the FMS 120 may receive data representative of the command to disable and/or enable its ability to receive flight plan data from the PU 150.

The ESSS 130 could include any aircraft system which participates in a sequence for starting an aircraft engine. For turbine engines, the ESSS 130 could include a pneumatic system configured with a pneumatic valve for controlling the flow of compressed air used to initiate a rotation of compressor blades. In some embodiments, the ESSS 130 could include a fuel system configured with a fuel valve for controlling a flow of fuel into a combustion chamber once the compressor blades have reached a sufficient rotational speed. In some embodiments, the ESSS 130 could include an ignition system configured with one or more ignitors for providing a spark(s) that ignites a combination of the fuel and air found in the combustion chamber. In some embodiments, the ESSS 130 could include an electronic engine control for controlling the operation of the engine. In some embodiments, the ESSS 130 may receive data representative of the command to disable and/or enable its operability during an engine start sequence from the PU 150.

For reciprocating engines, the ESSS 130 could include an electrical system through which power is controlled through a "master" switch and used by a mechanical starter to impart a rotation of a camshaft connected to pistons. In some embodiments, the ESSS 130 could include an electronic controller that, when energized by electrical power, controls engine operation.

The input device 140 could include any device (e.g., keyboard, control display unit, cursor control device (CCD), stylus, electronic grease pen, handheld device, touch screen device, notebook, tablet, electronic flight bag, user-wearable device) configured to receive pilot input such as, but not limited to, a selection of a graphical user interface (GUI) and/or entry of data. The input device 110 could be integrated with a screen of the display unit 160. In some embodiments, the input device 140 could include any speech recognition system that facilitates a voice selection of a GUI and/or entry of data. In some embodiments, the input device 140 may provide data representative of a pilot's input to the PU 150.

The PU 150 could include any electronic data processing unit which executes software or computer instruction code that could be stored, permanently or temporarily, in a digital memory storage device or a non-transitory computer-readable media (generally, memory 152) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The PU 150 may be driven by the execution of software or computer instruction code containing algorithms developed for the specific functions embodied herein. The PU 150 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PU 150 could also include more than one electronic data processing unit. In some embodiments, the PU 150 could be a processor(s) used by or in conjunction with any other system of the aircraft including, but not limited to, the AMDS 110, the FMS 120, the ESSS 130, the input device 140, and the display unit 160.

In some embodiments, the terms "programmed" and "configured" are synonymous. The PU 150 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless data/communications network, or as a signal received and/or transmitted by the PU 150 via a physical or a virtual computer port. The PU 150 may be programmed or configured to execute the method discussed in detail below. In some embodiments, the PU 150 may be programmed or configured to receive data from various systems and/or units including, but not limited to, the AMDS 110, the FMS 120, the ESSS 130, the input device 140, and the display unit 160. In some embodiments, the PU 150 may be programmed or configured to provide output data to various systems and/or units including, but not limited to, the AMDS 110, the FMS 120, the ESSS 130, and the display unit 160.

The display unit 160 may include one or more display units configured to present information visually to the pilot. The display unit could be part of an Electronic Flight Information System (EFIS) and could include, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices. The display unit 160 may be configured to present one or more display(s) or image(s). In some embodiments, the terms "display" and "image" are interchangeable and treated synonymously.

Figure 2A:
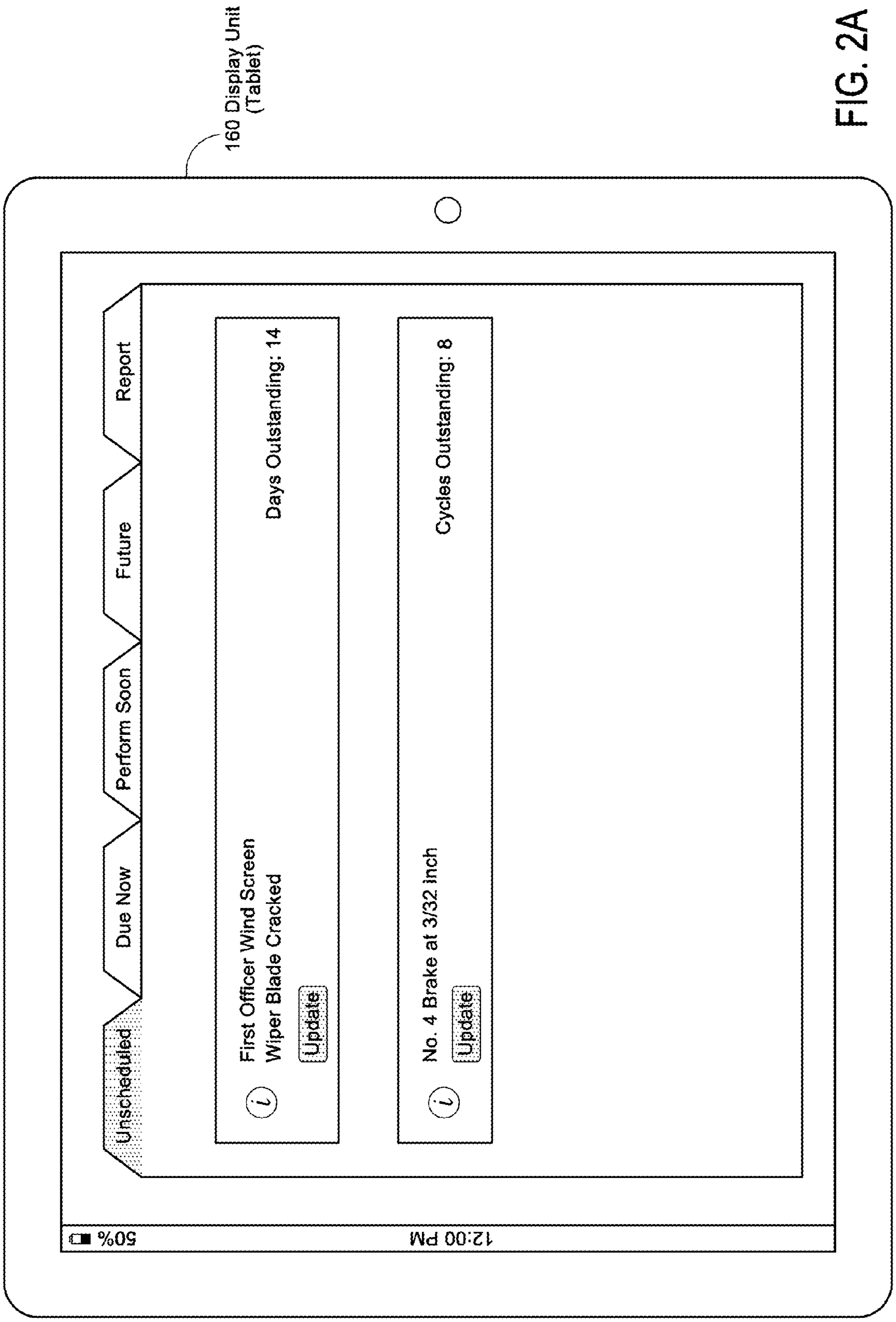
FIG. 2A depicts an exemplary embodiment of a format a page of the aircraft maintenance presentation system presented on a tablet according to the inventive concepts disclosed herein.

Referring now to FIG. 2A, an exemplary image of a page of the aircraft maintenance presentation system 100 is presented on an iPad®, a tablet designed and developed by Apple Incorporated. In some embodiments, one page of a plurality of pages may be displayed. As shown, an image includes five tabs: Unscheduled, Due Now, Perform Soon, Future, and Report. In addition, a page corresponding to the Unscheduled tab is shown with two maintenance strips. This page is shown in FIG. 3A and will be discussed in detail below.

Figure 2B:
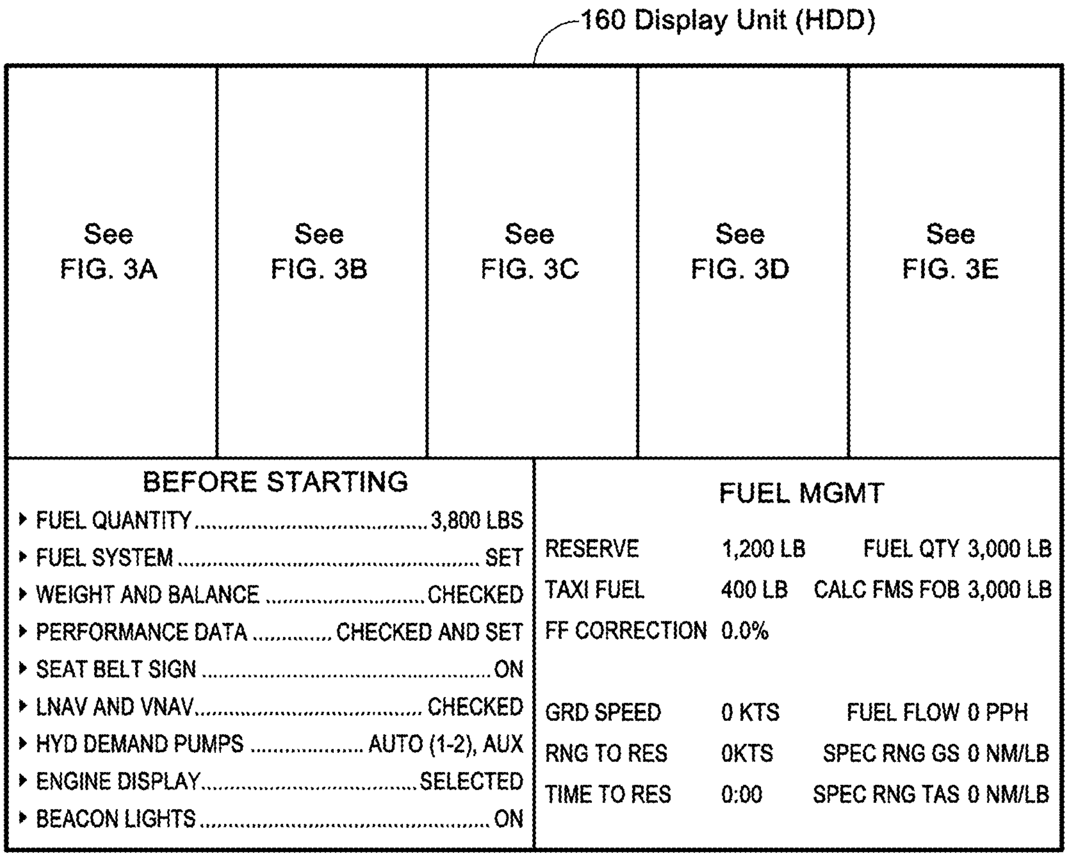
FIG. 2B depicts an exemplary embodiment of a plurality of pages of the aircraft maintenance presentation system presented on a head-dead display unit according to the inventive concepts disclosed herein.

Referring now to FIG. 2B, an exemplary image of a plurality of pages of the aircraft maintenance presentation system 100 is presented on an HDD installable in the cockpit of an aircraft. In some embodiments, more than one page may be displayed at one time. As shown on the upper half of the HDD, five pages cross-referencing FIGS. 3A-3E are presented simultaneously (maintenance strips have been intentionally omitted). Each of these pages will be discussed in detail below.

Figure 3A:
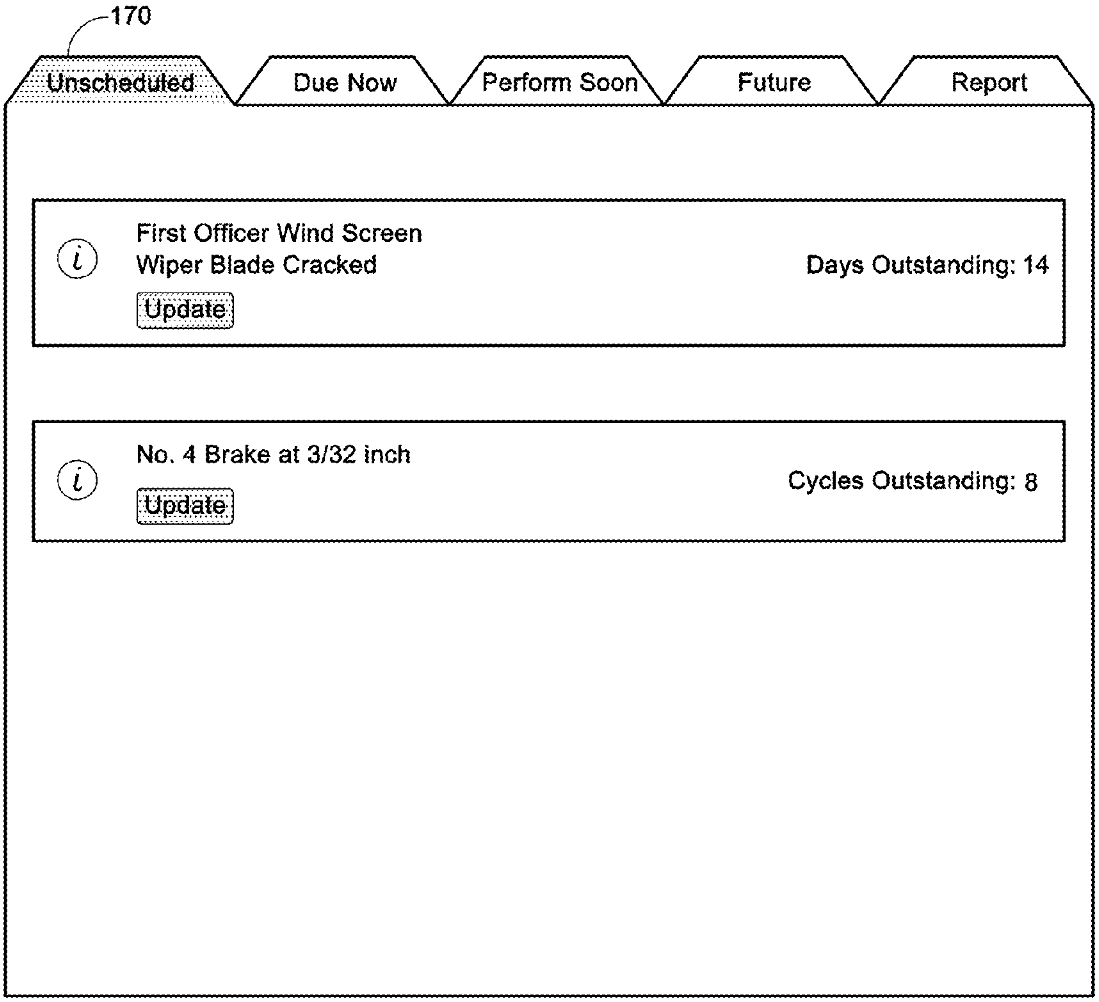
FIG. 3A depicts an exemplary embodiment of an image presenting two strips of unscheduled maintenance actions on a first page of the aircraft requirements presentation system according to the inventive concepts disclosed herein.

Some advantages and benefits of the inventive concepts disclosed herein are shown in FIGS. 3A through 4D, illustrating pages of the aircraft maintenance presentation system 100. Referring now to FIG. 3A, an exemplary image 170 presenting two strips of unscheduled maintenance actions of a hypothetical aircraft is illustrated on an Unscheduled page. One action relates to a wiper blade of the first officer, and the other to a number four brake. Here, the actions shown in one or both of these strips may have been created by a pilot and/or mechanic, and one or both could have been created using a page accessible using the Report tab.

As shown, the first officer wiper blade action has a count of 14 days outstanding to indicate that this was reported 14 days ago; the number four brake action has a count of 8 cycles outstanding to indicate that this was reported 8 cycles ago. Here, the creator of the action could have assigned days and cycles as the units for monitoring, respectively, while not defining them as scheduled maintenance actions. In some embodiments, the FMS 120 and/or the PU 150 may be programmed to begin counting the days and cycles from the time these actions were created.

Figure 3B:
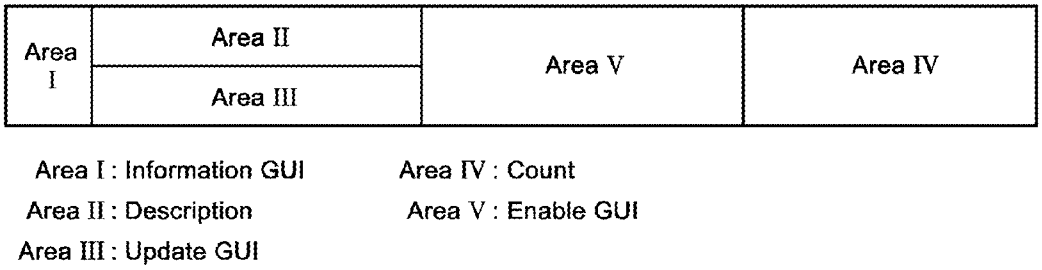
FIG. 3B depicts an exemplary embodiment of a maintenance strip divided into a plurality of areas according to the inventive concepts disclosed herein.

Referring now to FIG. 3B, a division of a maintenance action strip is shown, where the strip is divided into a plurality of areas: Areas I through V. Area I could be reserved for presenting a GUI (here, an encircled lowercase letter "i") which, when selected, could provide the viewer with additional details about the action. Area II could be reserved for a description of the action. Area III could be reserved for a GUI which, when selected, facilitates an updating of information on a separate page (not shown).

Area IV could be reserved for one or more counts of the action. In some embodiments, a count for unscheduled actions could include the number of units that the action has been outstanding. In some embodiments, a count for scheduled maintenance actions could include a pre-flight count, a flight plan count, and a post-flight count. The pre-flight count could be a count remaining on the action prior to the flight and represented in data acquired from the AMDS 110. The flight plan count could be a count corresponding to the flight plan and represented in data acquired from the FMS 120. The post-flight count could be an estimated count that will remain after the flight ends and determined from the pre-flight and flight plan counts.

Area V could be reserved for one or more GUIs which, when presented, conveys to the pilot that one or more systems or functionality of the systems have been disabled because, for example, a pre-flight count and/or a post-flight count has reached zero or is less than zero. This action may prevent an aircraft from exceeding a scheduled maintenance action. In some embodiments, the selection of the GUI could enable a disabled system or system functionality.

Figure 3C:
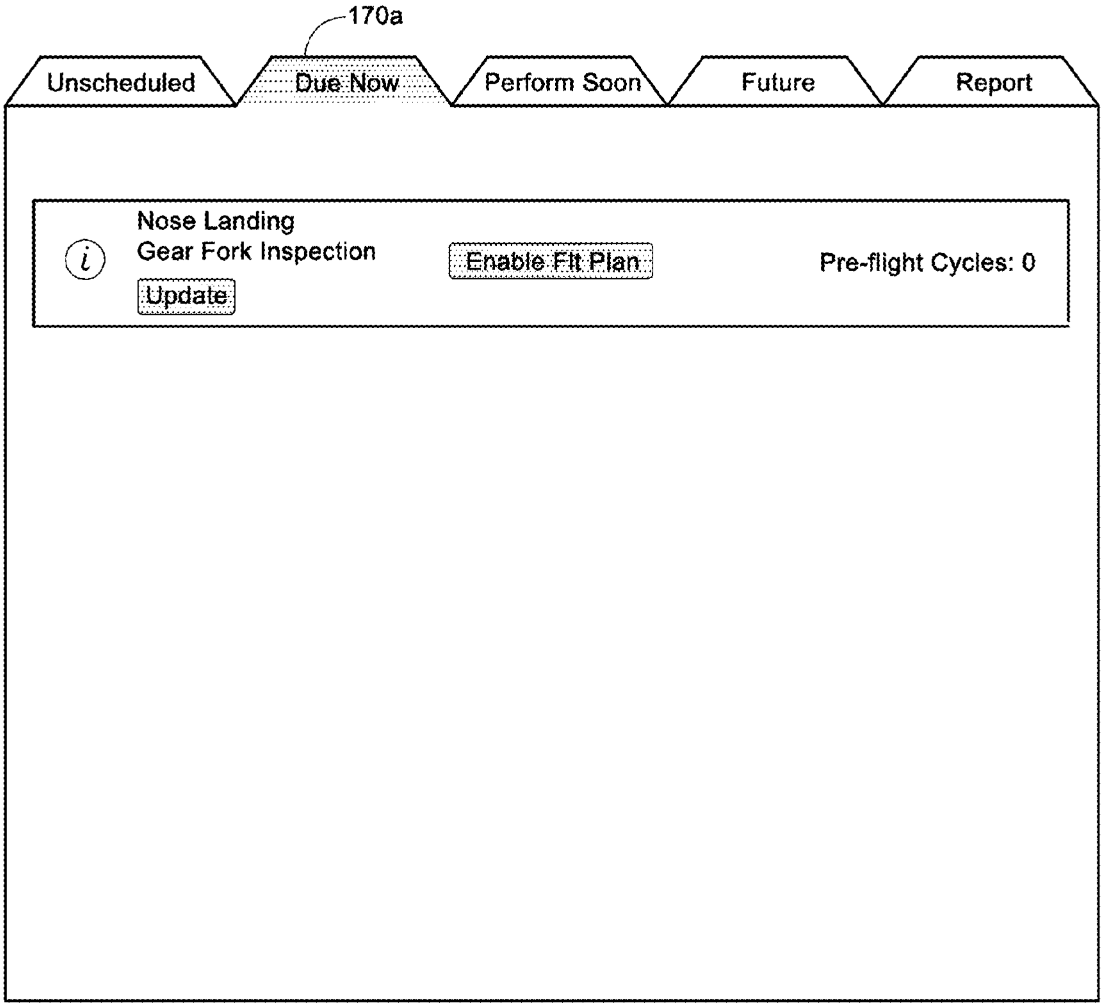
FIG. 3C depicts an exemplary embodiment of an image presenting one strip of a scheduled maintenance action on a second page of the aircraft requirements presentation system according to the inventive concepts disclosed herein.

Referring now to FIG. 3C, an exemplary image 170*a* presenting one strip of a scheduled maintenance action of the hypothetical aircraft is illustrated on a Due Now page, where the action relates to an inspection of a fork of the nose landing gear. In some embodiments, the action shown in this strip (and other scheduled maintenance strips) could have been scheduled by the manufacturer, aircraft owner, and/or aircraft operator. In some embodiments, the action could have been scheduled by a pilot and/or mechanic when, for instance, the action was created.

As shown, the count indicates pre-flight cycles of zero, informing the pilot during the performance of a pre-flight checklist that the nose landing gear fork inspection is due and required before the next flight; otherwise, a scheduled maintenance may be improperly exceeded unless a remedial action is taken. In some embodiments, the pre-flight count may zero when the end of the interval is reached. In some embodiments, the pre-flight count may include the maximum limit of the interval, and zero may indicate the maximum limit being reached.

As shown, an "Enable Flt Plan" GUI is presented to convey to the pilot that a functionality of the FMS 120 has been disabled which could include the functionality that enables the FMS 120 to receive flight plan data. In some embodiments, the PU 150 may be programmed to notify the FMS 120 when the pre-flight count has reached zero or is less than zero. In some embodiments, the PU 150 may be programmed to display the "Enable Flt Plan" GUI that, when selected, may cause the disabled functionality to become enabled. In some embodiments, an "Enable Eng Start" GUI (not shown) could be presented additionally with or alternatively to the "Enable Flt Plan" GUI.

Figure 3D:
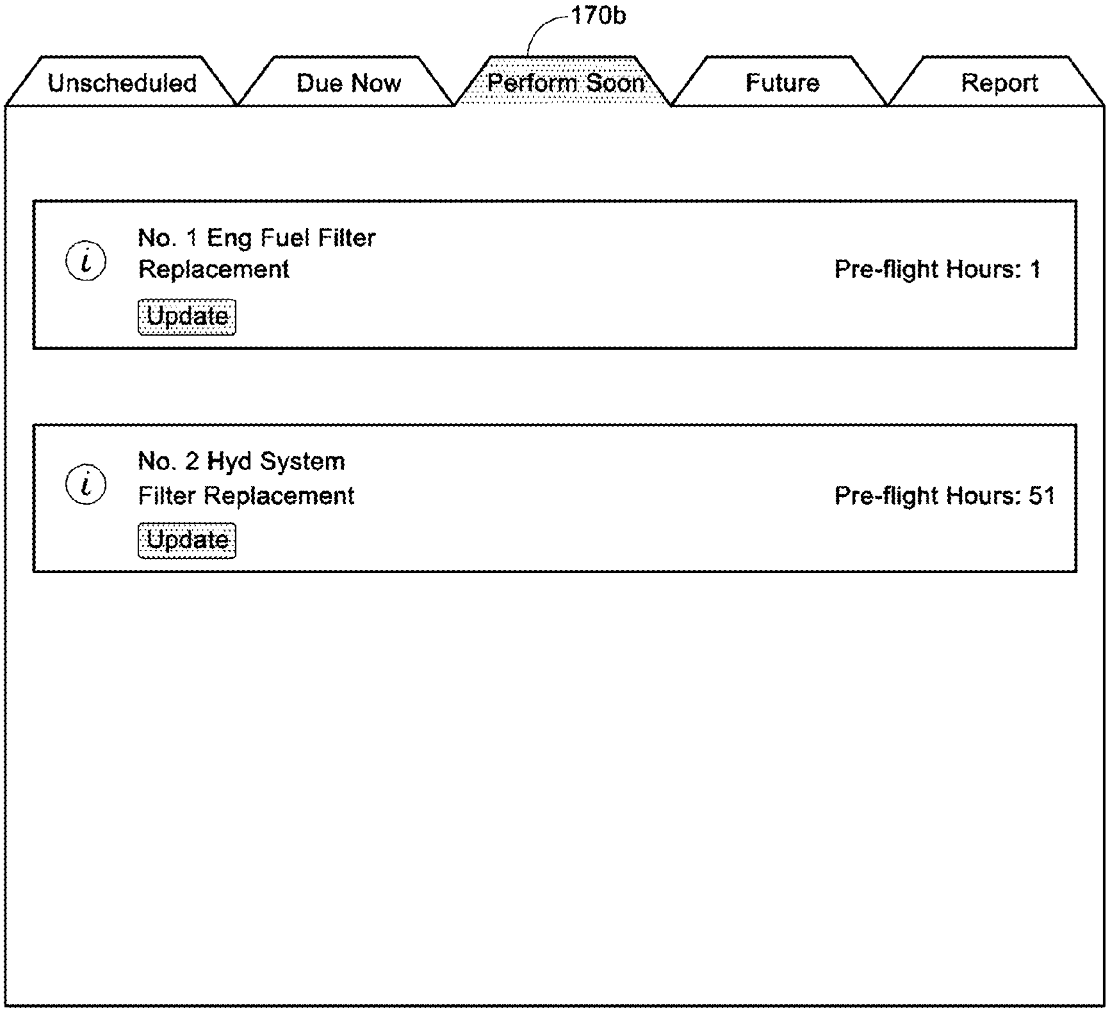
FIG. 3D depicts an exemplary embodiment of an image presenting two strips of scheduled maintenance actions on a third page of the aircraft requirements presentation system according to the inventive concepts disclosed herein.

Referring now to FIG. 3D, an exemplary image 170*b* presenting two strips of scheduled maintenance actions of the hypothetical aircraft is illustrated on a Perform Soon page, where these scheduled maintenance actions may be those which fall within its interval range. One action relates to a replacement of a fuel filter of a number one engine, and the other to a replacement of a filter of a number two hydraulic system. For the number one engine fuel filter replacement, the pre-flight count is one hour, informing the pilot that only one more hour remains in the interval before the action becomes due, where the interval unit could be an engine hour. For the number two hydraulic system filter replacement, the pre-flight count is 51 hours, informing the pilot that fifty-one hours remain in the interval before the action becomes due, where the interval unit could be a flight hour.

Figure 3E:
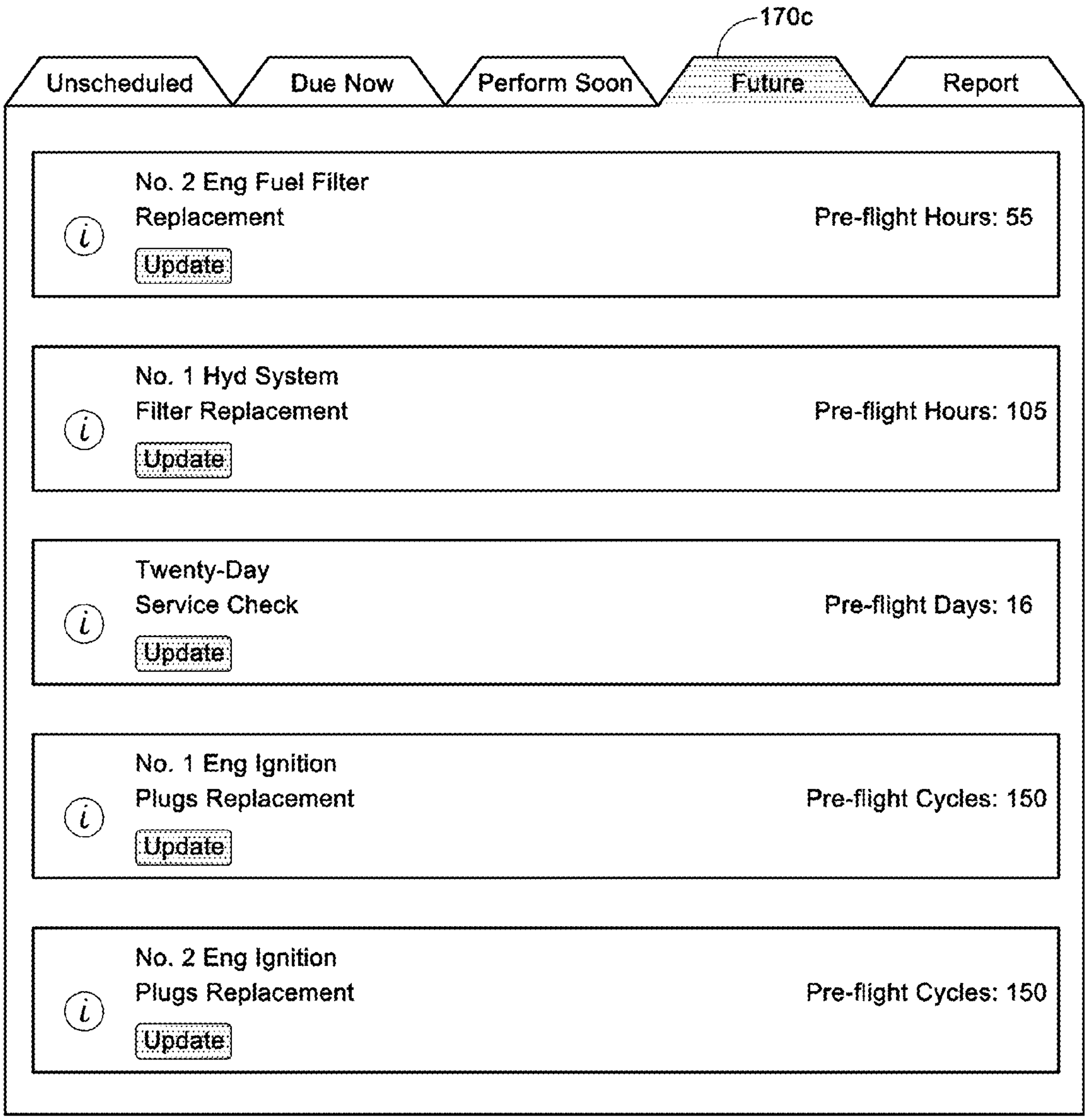
FIG. 3E depicts an exemplary embodiment of an image presenting five strips of scheduled maintenance actions on a fourth page of the aircraft requirements presentation system according to the inventive concepts disclosed herein.

Referring now to FIG. 3E, an exemplary image 170*c* presenting five strips of scheduled maintenance actions of the hypothetical aircraft is illustrated on a Future page, where these scheduled maintenance actions may be those which have not reached the minimum limit of the interval that begins the interval range. After reviewing the information presented on the five strips, the pilot is informed that a replacement of the number two engine fuel filter becomes due in fifty-five engine hours, a replacement of the number one hydraulic system filter becomes due in one-hundred five flight hours, a twenty day service check becomes due in sixteen days, and a replacement of ignition plugs for the number one and number two engines become due in 150 engine hours.

Figure 3F:
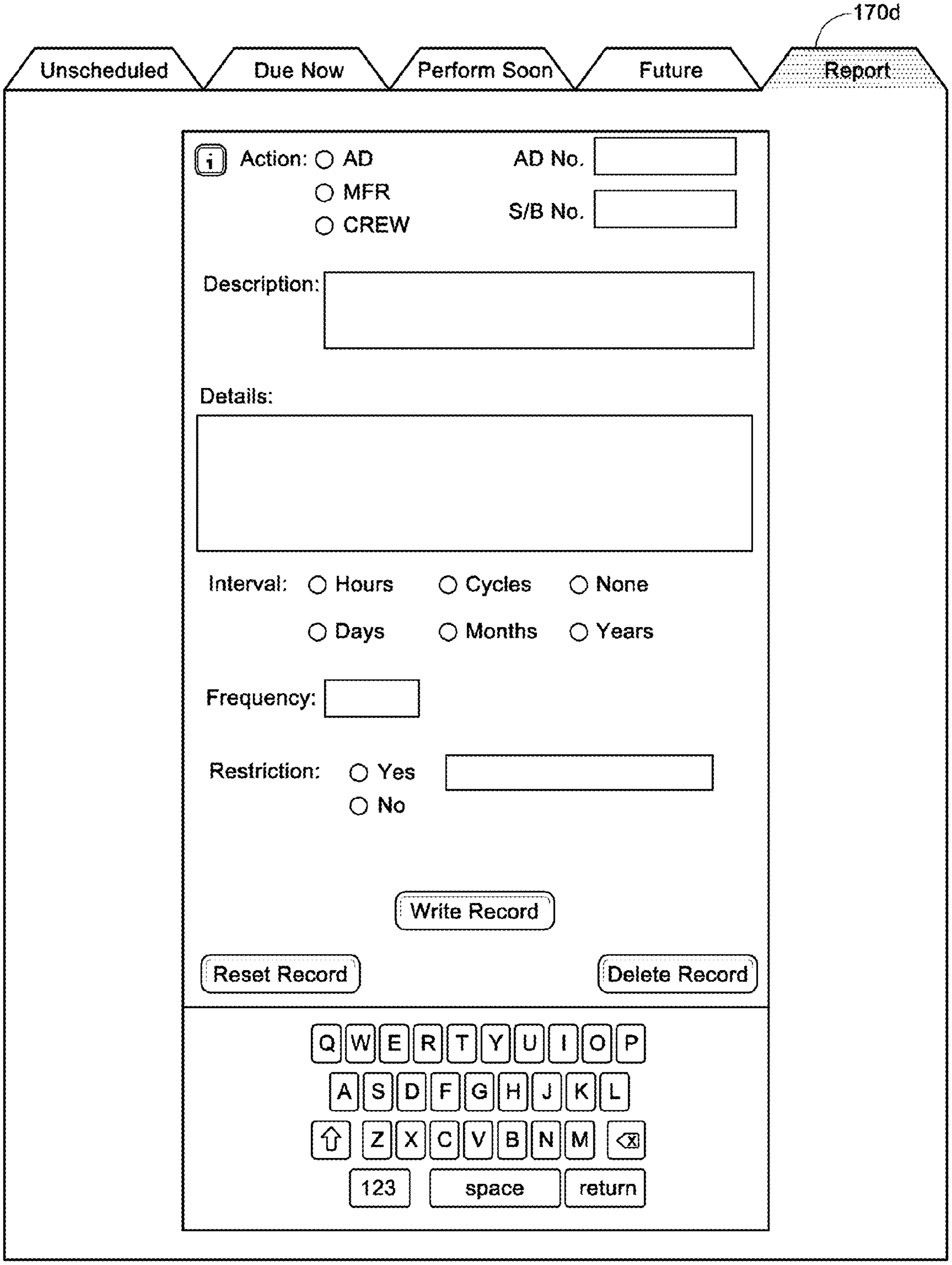
FIG. 3F depicts an exemplary embodiment of an image presenting a reporting form on a fifth page of the aircraft requirements presentation system according to the inventive concepts disclosed herein.

Referring now to FIG. 3F, an exemplary image 170*d* presenting images of an input device 140 (i.e., an image of a keyboard) and an exemplary form is illustrated on a Report page. For the purpose of illustration and not of limitation, a simple form containing a limited number of fields is shown. As shown, a source of the action may be reported. If the action arises from an Airworthiness Directive (AD) issued by the FAA, the "AD" button may be selected and the AD number may be entered. If the action arises from a manufacturer's service bulletin (S/B), the "MFR" button may be selected and the S/B number may be entered. If the flight crew creates the action, the "CREW" button may be selected.

A description and additional details of the action may be entered in the Description and Details fields, respectively. An interval unit and an interval may be entered if prescribed by the AD or S/B or scheduled by the pilot; if there is no prescribed or scheduled interval, then the "None" button may be selected. Also, a restriction may be entered as necessary (e.g., maximum altitude of flight, flight limited to Visual Flight Rules (VFR), flight not permitted under Instrument Flight Rules (IFR), daylight flight operations only). Once the action information has been entered, a Write Record GUI could be selected to record the action to the AMDS 110. If a mistake(s) is made when entering the information, a Reset Record GUI may be selected; if a deletion of the action is appropriate, a Delete Record GUI may be selected.

To illustrate how an action may be entered on the Report page and from which a maintenance strip may be generated, assume that the flight crew has been informed that a coffee maker located in the aft cabin is not working. Referring to the Report page, a pilot may select the "CREW" button, enter "Aft Cabin Coffee Maker Inop" in the Description field to report it as being inoperative, leave the Details field blank, select the "None" button so that an interval is not scheduled, and select the "No" button of Restriction so that a restriction is not placed on the action. Once the information has been entered, the pilot may select the Write Record GUI, at which time the record may be recorded and stored in the AMDS 110.

Figure 4A:
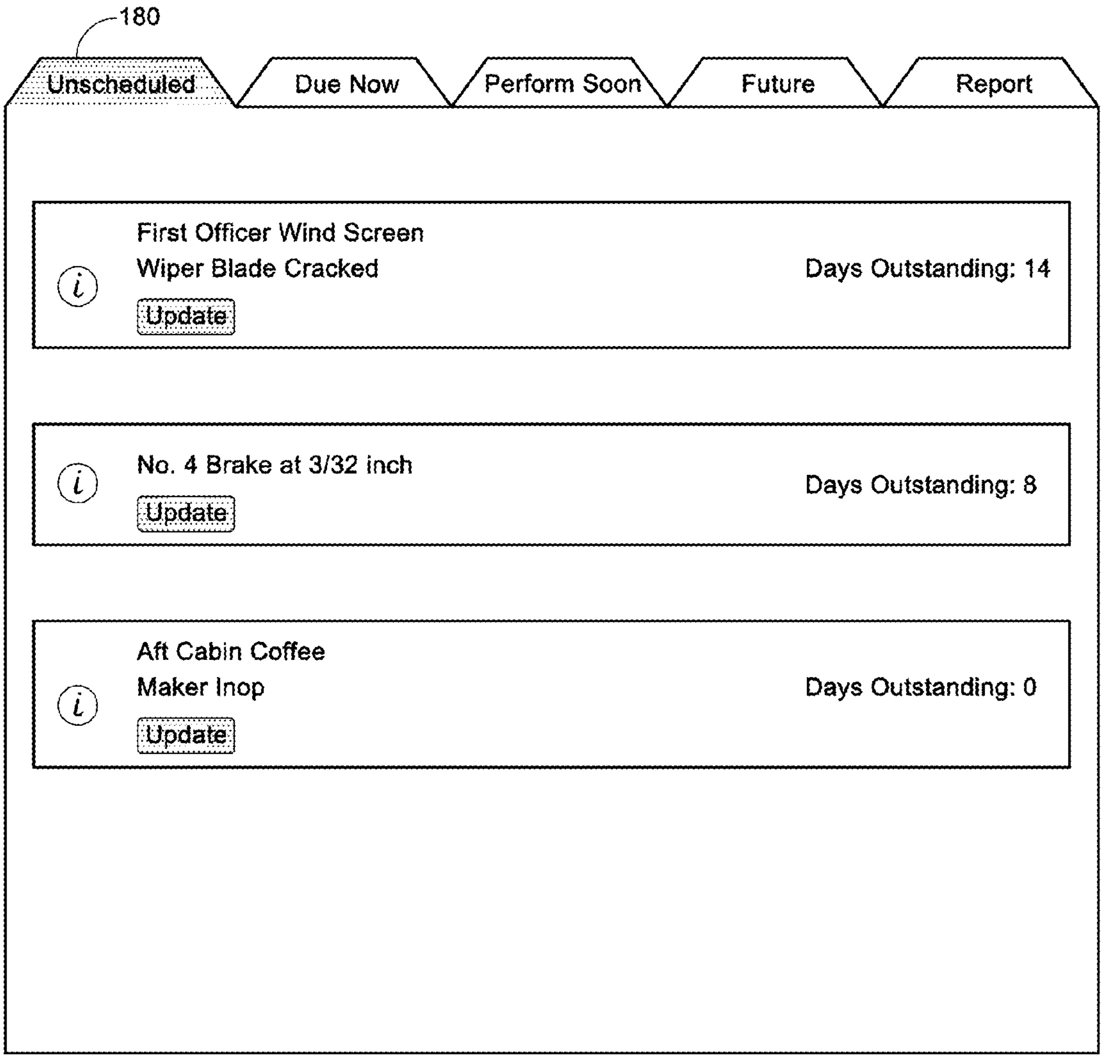
FIG. 4A depicts an exemplary embodiment of an image presenting three strips of unscheduled maintenance actions on the first page depicted in FIG. 3A according to the inventive concepts disclosed herein.

Referring now to FIG. 4A, an exemplary image 180 presenting the Unscheduled page on which the newly-entered action corresponding to the inoperative coffee maker has been added as a third maintenance strip to the two previous strips of FIG. 3A. If the pilot had assigned an interval and interval unit, then the maintenance strip could have been presented as a scheduled maintenance action on another page such as the Due Now page, the Perform Soon page, or the Future page, depending on the interval and interval unit assigned by the pilot.

Figure 4B:
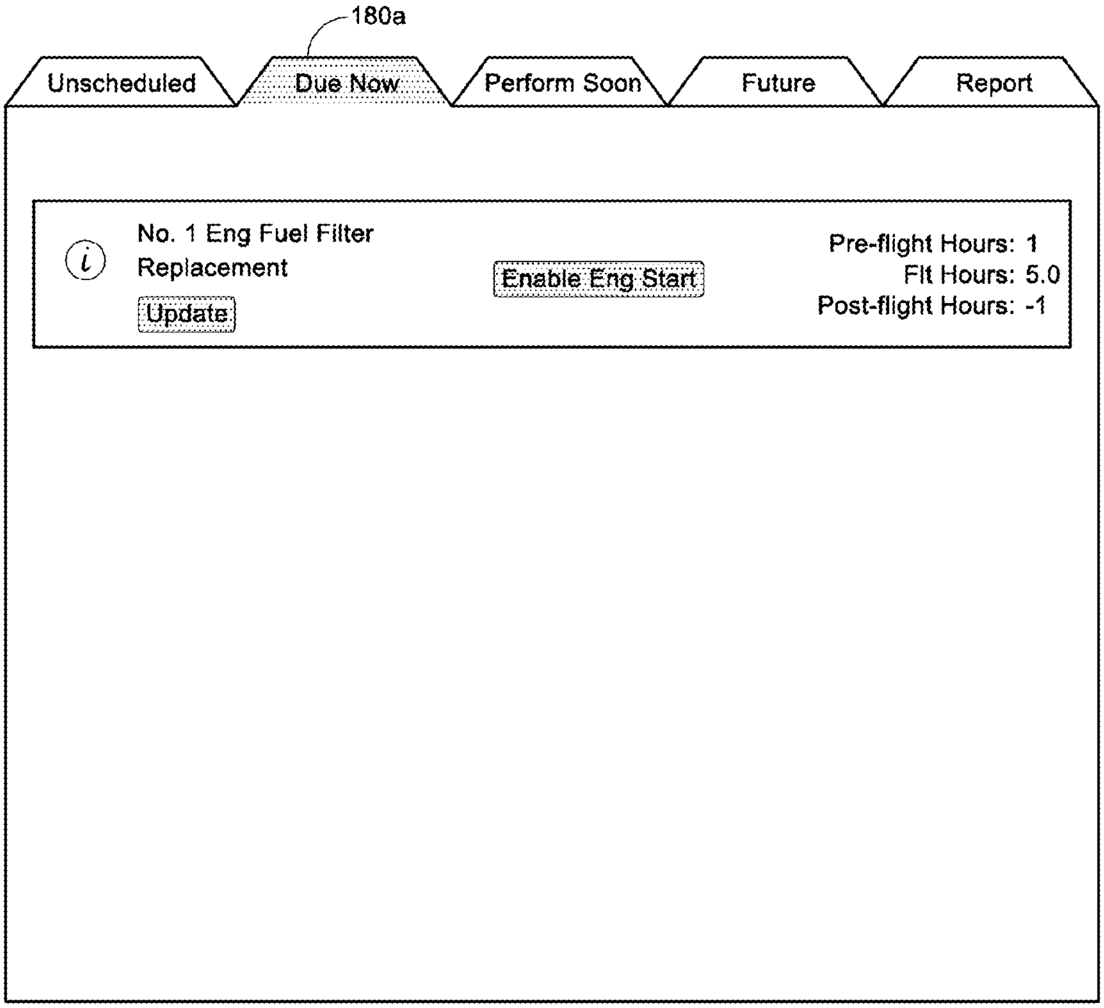
FIG. 4B depicts an exemplary embodiment of an image presenting one strip of a scheduled maintenance action on the second page depicted in FIG. 3C according to the inventive concepts disclosed herein.
Figure 4C:
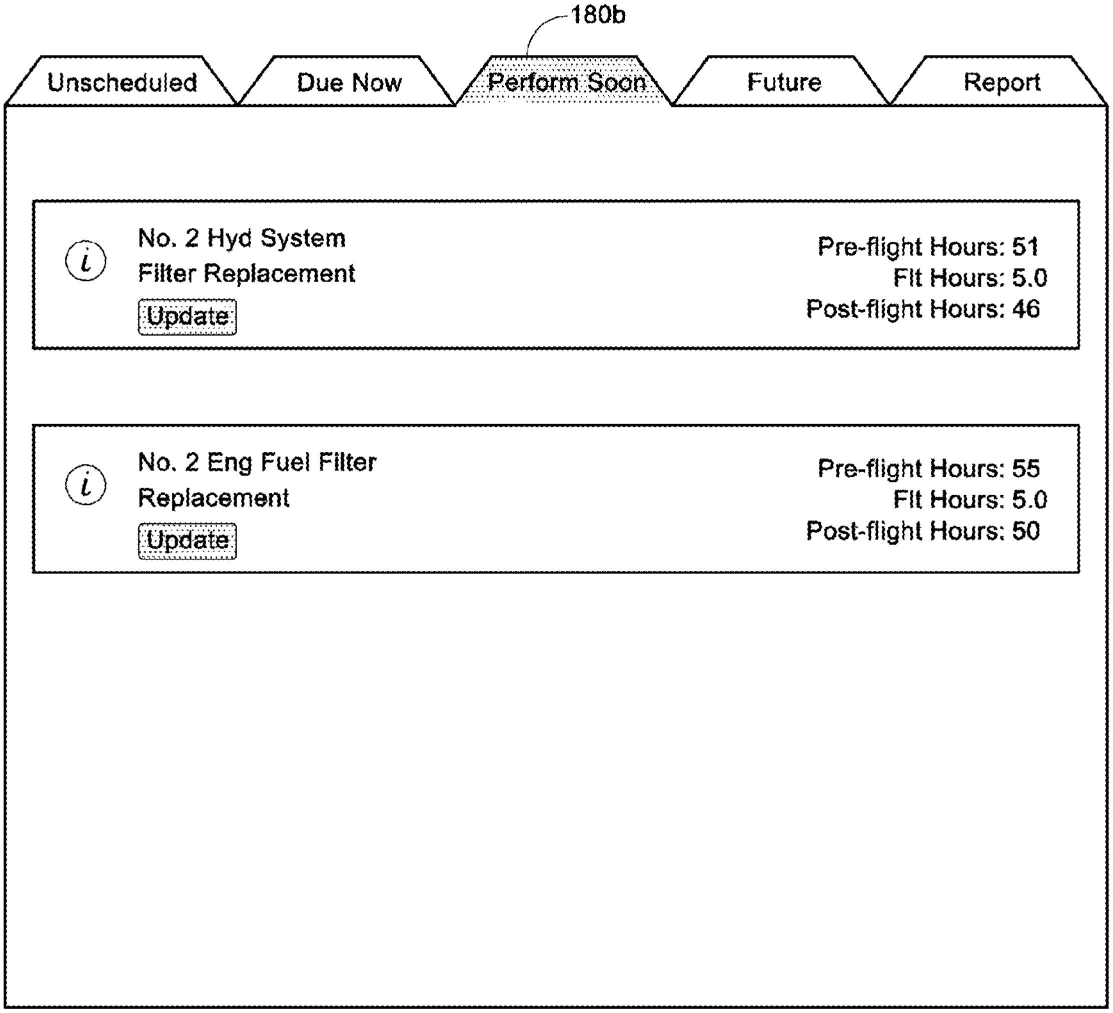
FIG. 4C depicts an exemplary embodiment of an image presenting two strips of scheduled maintenance actions on the third page depicted in FIG. 3D according to the inventive concepts disclosed herein.
Figure 4D:
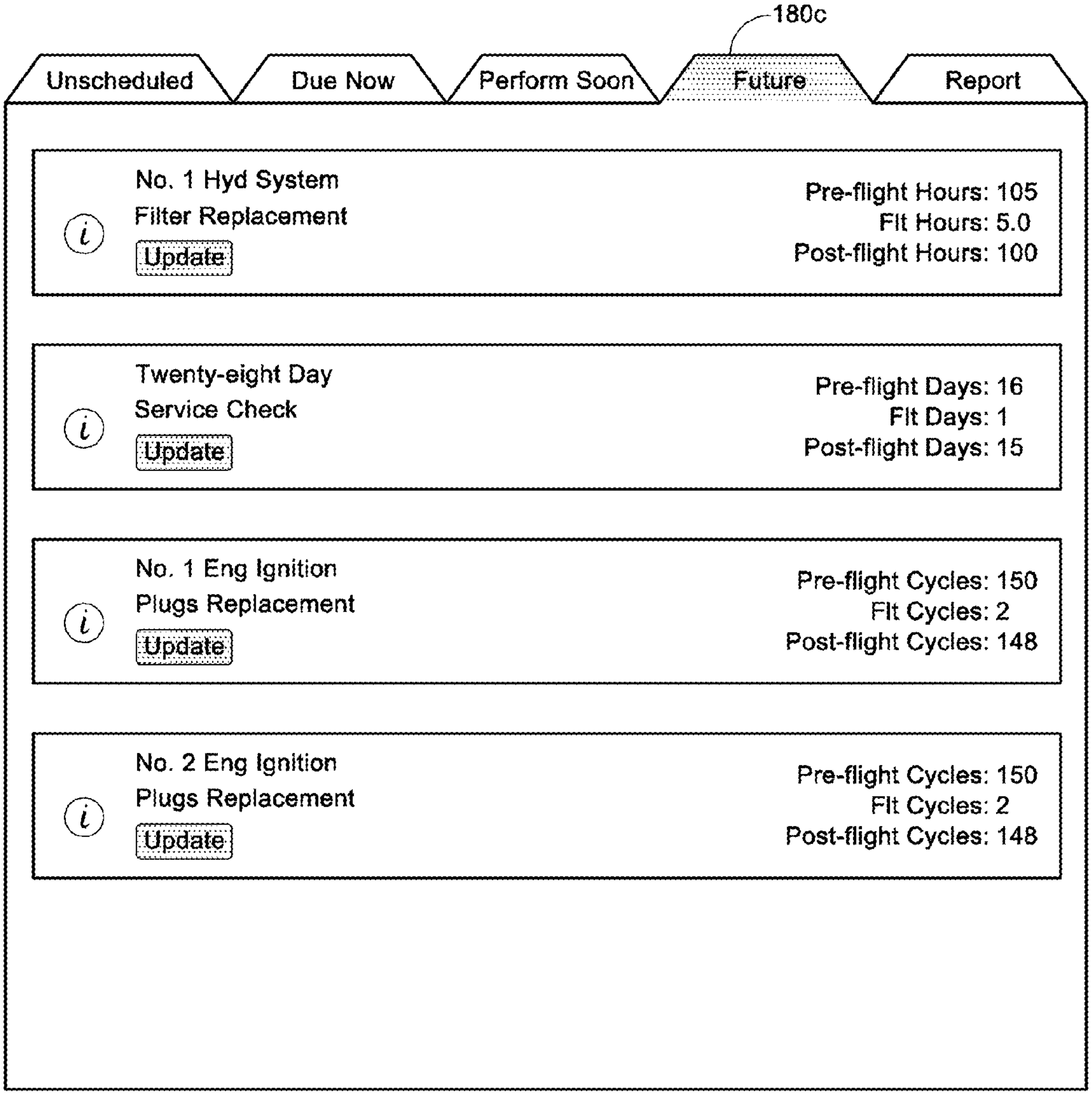
FIG. 4D depicts an exemplary embodiment of an image presenting four strips of scheduled maintenance actions on the fourth page depicted in FIG. 3E according to the inventive concepts disclosed herein.

Referring now to FIGS. 4B-4D, it will be assumed that the maintenance action relating to the inspection of the nose landing gear fork shown in FIG. 3C has been addressed, resolved, and removed from the Due Now page. It will also be assumed that flight plan data for the next flight has been acquired from the FMS 120, and that the data is representative of two flights (i.e., two cycles) having a total estimated flight time of 5.0 hours, where the flight begins on one calendar day and ends on the next.

As shown in FIG. 4B, an exemplary image 180*a* presenting one strip of a scheduled maintenance action of the hypothetical aircraft is illustrated on the Due Now page, where the action is the number one engine fuel filter replacement shown in FIG. 3D. As observed in FIG. 4B, a flight plan count and a post-flight count are included in the presentation. Assuming that the fuel filter has not been replaced, the flight plan count and a post-flight count of five engine hours and negative one engine hours are respectively presented. Because the post-flight count is equal to or less than zero, the maintenance strip of the action is now being presented on the Due Now page.

As observed, an "Enable Eng Start" GUI is also presented to convey to the pilot that the functionality of a component(s) of a system(s) of the ESSS 130 participating in an engine start sequence has been disabled. In some embodiments, the PU 150 may be programmed to notify at least one ESSS 130 when the post-flight count has reached zero or is less than zero. In some embodiments, the PU 150 may be programmed to display the "Enable Eng Start" GUI for which an affirmative or positive selection of a GUI is necessary to enable the disabled functionality.

As shown in FIG. 4C, an exemplary image 180*b* presenting two strips of scheduled maintenance actions of the hypothetical aircraft is illustrated on the Perform Soon page. One action relates to the number two hydraulic system filter replacement of FIG. 3D, and the other to the number two engine fuel filter replacement of FIG. 3E. As observed in FIG. 4C, flight plan counts and post-flight counts for both actions are included in the presentation. Assuming that the post-flight counts (46 flight hours and 50 flight hours) fall within the respective interval ranges, they may be presented on the Perform Soon page.

Referring now to FIG. 4D, an exemplary image 180*c* presenting four strips of scheduled maintenance actions of the hypothetical aircraft is illustrated on the Future page. When compared with four of the five schedule maintenance actions presented on the strips of FIG. 3E (the fifth action is shown in FIG. 4C), the flight plan counts of the four remaining actions have been included after the flight plan data has been acquired from the FMS 120. Also, the post-flight counts may have been determined from the pre-flight and flight plan counts. Assuming that the post-flight counts actions have not reached the minimum limits of their respective intervals, they may be presented on the Future page.

Figure 5:
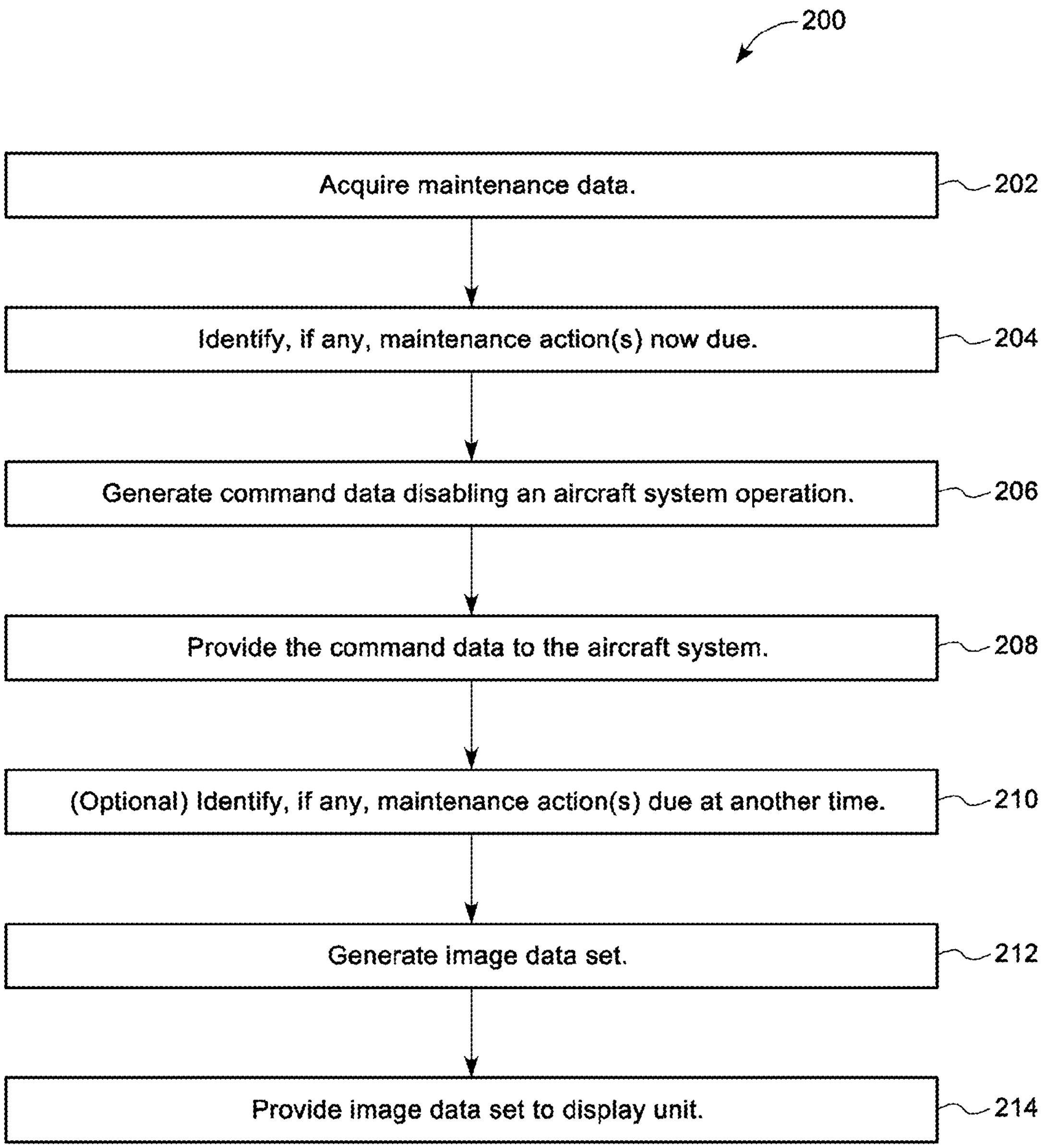
FIG. 5 depicts an exemplary embodiment of a flowchart disclosing a method for presenting aircraft requirements information according to the inventive concepts disclosed herein.

FIG. 5 depicts flowchart 200 disclosing an example of a method for presenting aircraft requirements to a pilot, where the PU 150 may be programmed or configured with instructions corresponding to the modules embodied in flowchart 200. In some embodiments, the method may be employed in an application or "app" installable in an electronic tablet. In some embodiments, the PU 150 may be a processor or a combination of processors found in the display unit 160 or any other system suitable for performing the task. Also, the PU 150 may be a processor of a module such as, but not limited to, a printed circuit card having one or more input interfaces to facilitate the two-way data communications of the PU 150, i.e., the receiving and providing of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with the PU 150 acquiring maintenance data for an aircraft from the AMDS 110, where the maintenance data may be representative of one or more scheduled and/or unscheduled maintenance actions. In some embodiments, each scheduled maintenance action may include a description of the scheduled maintenance action, an interval, an interval unit, an interval range, and one or more counts. In some embodiments, the PU 150 may acquire flight plan data representative of a flight plan count from the FMS 120 which could include flight hour(s), flight cycle(s), and/or calendar days of the flight plan.

The method of flowchart 200 continues with module 204 with the PU 150 identifying, if any, one or more scheduled maintenance actions that are due now (i.e., due at the present time). In some embodiments, the actions may become due when the pre-flight count and/or post-flight count are equal to or less than zero.

The method of flowchart 200 continues with module 206 with the PU 150 generating command data representative of a command to disable functionality of an operation(s) of one or more aircraft systems when one or more scheduled maintenance actions that are due now have been identified. In some embodiments, the aircraft system could be the FMS 120 configured to receive data representative of a flight plan. In some embodiments, the aircraft system could be at least one ESSS 130 configured to participate in an engine start sequence.

The method of flowchart 200 continues with module 208 with the PU 150 providing the command data to the aircraft system(s), whereupon the functionality may be disabled. In some embodiments, the functionality which enables the FMS 120 to receive flight plan data may be disabled. In some embodiments, the functionality which enables at least one ESSS 130 to participate in an engine start sequence may be disabled.

The method of flowchart 200 continues with an optional module 210 with the IG 150 identifying, if any, one or more scheduled maintenance actions that are not due now (i.e., due at a time different from the present time). In some embodiments, each of these actions may be the action for which the interval count falls within their interval ranges but are not due now.

The method of flowchart 200 continues with module 212 with the IG 150 generating the image data set as a function of each scheduled maintenance action that is due now. In some embodiments, the function could include each scheduled maintenance actions that is not due now. In some embodiments, the function could include each unscheduled maintenance action. In some embodiments, the image data set may be representative of one or more page images such as, for example, those that have been previously discussed.

The method of flowchart 200 continues with module 214 with the IG 150 providing the image data set to the display unit 160. When received by the display unit 160, the one or more page images represented in the image data set may be presented to a viewer. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for presenting aircraft requirements, comprising:

a source of maintenance data configured to provide maintenance data representative of a plurality of scheduled maintenance actions for one aircraft, where each one of the plurality of scheduled maintenance actions includes at least an action description, an interval unit, an interval range, and a plurality of counts;

at least one aircraft system configured with functionality to perform an operation; and a display unit configured to:

receive an image data set representative of at least one page image provided by:

a processing unit including at least one processor coupled to a non-transitory processor-readable medium storing processor-executable code and configured to:

acquire the maintenance data;

identify, if any, at least one scheduled maintenance action due at the present time as a function of at least one of the plurality of counts;

generate command data representative of a command to disable the functionality of the at least one aircraft system in response to the identification of the at least one scheduled maintenance action;

provide the command data to the at least one aircraft system, whereupon the functionality of the at least one aircraft system is disabled upon receiving the command data;

generate the image data set as a function of at least one identified scheduled maintenance action, such that one page image of the at least one page image is formatted to present at least one maintenance strip divided into a plurality of strip areas for each one identified maintenance action, where a first strip area is formatted to present the action description of an identified scheduled maintenance action, a second strip area is formatted to present one of the plurality of counts of an identified scheduled maintenance action, and a third strip area formatted to present a graphical user interface (GUI), where the GUI is presented in response to the command data being generated; and provide the image data set to the display unit; and present at least one page image represented in the image data set to a viewer.

2. The system of claim 1, wherein the at least one aircraft system configured with functionality to perform an operation is comprised of at least one of:

a flight management system configured with functionality to receive data representative of a flight plan, and at least one engine start sequence system configured with functionality to participate in an engine start sequence.

3. The system of claim 1, wherein each one of the at least one scheduled maintenance action due at the present time is a scheduled maintenance action having a pre-flight court equal to or less than zero.

4. The system of claim 1, wherein one of the at least aircraft system configured to perform an operation is a flight management system configured with functionality to provide flight plan data representative of a plurality of flight plan counts, and the processing unit is further configured to:

acquire the flight plan data; and determine a post-flight count for each one of the plurality of scheduled maintenance actions, such that the function for identifying at least one scheduled maintenance action due at the present time includes at least one post-flight count, and the second strip area is further formatted to present one of the plurality of flight plan counts and the post-flight count of the identified scheduled maintenance action.

5. The system of claim 4, wherein the at least one scheduled maintenance action due at the present time is the at least one first scheduled maintenance action due at the present time, mone identified scheduled maintenance action is one first identified scheduled maintenance action, the one page image of the at least one page image is a first page image of the at least one page image, and the processing unit is further configured to:

identify, if any, at least one second scheduled maintenance action due at a time different from the present time and falling within its interval range, such that the function for generating the image data set includes the at least one second identified scheduled maintenance action; and identify, if any, at least one third scheduled maintenance action due at a time different from the present time and falling outside of its interval range, such that the function for generating the image data set includes the at least one third identified scheduled maintenance action, such that a second page image of the plurality of page images is formatted to present at least one maintenance strip divided into a plurality of strip areas for each one second identified scheduled maintenance action, where a fourth strip area is formatted to present the action description of an second identified scheduled maintenance action, and a fifth strip area is formatted to present one of the plurality of counts represented in the maintenance data, one of the plurality of flight plan counts, and the post-flight count of a second identified scheduled maintenance action, and a third page image of the plurality of page images is formatted to present at least one maintenance strip divided into a plurality of strip areas for each one third identified scheduled maintenance action, where a sixth strip area is formatted to present the action description of a third identified scheduled maintenance action, and a seventh strip area is formatted to present one of the plurality of counts represented in the maintenance data, one of the plurality of flight plan counts, and the post-flight count of a third identified scheduled maintenance action.

6. The system of claim 5, wherein each one of the at least one second scheduled maintenance action is a scheduled maintenance action having a post-flight court greater than zero, and each one of the at least one third scheduled maintenance action is a scheduled maintenance action having a post-flight court greater than zero.

7. The system of claim 1, wherein the maintenance data is further representative of at least one unscheduled maintenance action that includes at least an action description and an outstanding count, such that the function for generating the image data set includes the at least one unscheduled maintenance action, such that a second page image of the plurality of page images is formatted to present at least one maintenance strip divided into a plurality of strip areas for each one unscheduled maintenance action, where a fourth strip area is formatted to present the action description of the unscheduled maintenance action, and a fifth strip area is formatted to present at least the outstanding count.

8. The system of claim 1, further comprising:

an input device configured to provide input data representative of a pilot's selection of the GUI, such that the command data is first command data, and the processing unit is further configured to:

receive the input data;

generate second command data representative of a command to enable the disabled functionality of one aircraft system in response to receiving the input data; and provide the second command data to one aircraft system with disabled functionality, where the disabled functionality of one aircraft system is enabled upon receiving the second command data.

9. A device for presenting aircraft requirements, comprising:

a processing unit including at least one processor coupled to a non-transitory processor-readable medium storing processor-executable code and configured to:

acquire maintenance data representative of a plurality of scheduled maintenance actions for one aircraft, where each one of the plurality of scheduled maintenance actions includes at least an action description, an interval unit, an interval range, and a plurality of counts;

identify, if any, at least one scheduled maintenance action due at the present time as a function of at least one of the plurality of counts;

generate command data representative of a command to disable functionality of at least one aircraft system in response to the identification of the at least one scheduled maintenance action;

provide the command data to the at least one aircraft system, such that the functionality of the at least one aircraft system is disabled upon receiving the command data;

generate an image data set as a function of at least one identified scheduled maintenance action, where one page image of the at least one page image is formatted to present at least one maintenance strip divided into a plurality of strip areas for each one identified maintenance action, where a first strip area is formatted to present the action description of an identified scheduled maintenance action, a second strip area is formatted to present one of the plurality of counts of an identified scheduled maintenance action, and a third strip area formatted to present a graphical user interface (GUI), where the GUI is presented in response to the command data being generated; and provide the image data set to a display unit, whereby at least one page image represented in the image data set is presented to a viewer.

10. The device of claim 9, wherein each one of the at least one scheduled maintenance action due at the present time is a scheduled maintenance action having a pre-flight court equal to or less than zero.

11. The device of claim 9, wherein the processing unit is further configured to:

acquire flight plan data representative of a plurality of flight plan counts; and determine one post-flight count for each one of the plurality of scheduled maintenance actions, such that the function for identifying at least one scheduled maintenance action due at the present time includes at least one post-flight count, and the second strip area is further formatted to present one of the plurality of flight plan counts and the post-flight count of the identified scheduled maintenance action.

12. The device of claim 11, wherein the at least one scheduled maintenance action due at the present time is the at least one first scheduled maintenance action due at the present time, one identified scheduled maintenance action is one first identified scheduled maintenance action, the one page image of the at least one page image is a first page image of the at least one page image, and the processing unit is further configured to:

identify, if any, at least one second scheduled maintenance action due at a time different from the present time and falling within its interval range, such that the function for generating the image data set includes the at least one second identified scheduled maintenance action; and identify, if any, at least one third scheduled maintenance action due at a time different from the present time and falling outside of its interval range, such that the function for generating the image data set includes the at least one third identified scheduled maintenance action, such that a second page image of the plurality of page images is formatted to present at least one maintenance strip divided into a plurality of strip areas for each one second identified scheduled maintenance action, where a fourth strip area is formatted to present the action description of an second identified scheduled maintenance action, and a fifth strip area is formatted to present one of the plurality of counts represented in the maintenance data, one of the plurality of flight plan counts, and the post-flight count of a second identified scheduled maintenance action, and a third page image of the plurality of page images is formatted to present at least one maintenance strip divided into a plurality of strip areas for each one third identified scheduled maintenance action, where a sixth strip area is formatted to present the action description of a third identified scheduled maintenance action, and a seventh strip area is formatted to present one of the plurality of counts represented in the maintenance data, one of the plurality of flight plan counts, and the post-flight count of a third identified scheduled maintenance action.

13. The device of claim 12, wherein each one of the at least one second scheduled maintenance action is a scheduled maintenance action having a post-flight court greater than zero, and each one of the at least one third scheduled maintenance action is a scheduled maintenance action having a post-flight court greater than zero.

14. The device of claim 9, wherein
the maintenance data is further representative of at least one unscheduled maintenance action that includes at least an action description and an outstanding count, such that
the function for generating the image data set includes the at least one unscheduled maintenance action, such that
a second page image of the plurality of page images is formatted to present at least one maintenance strip divided into a plurality of strip areas for each one unscheduled maintenance action, where
a fourth strip area is formatted to present the action description of the unscheduled maintenance action, and
a fifth strip area is formatted to present at least the outstanding count.

15. A method for presenting aircraft requirements, comprising:
acquiring, by a processing unit including at least one processor coupled to a non-transitory processor-readable medium storing processor-executable code, maintenance data representative of a plurality of scheduled maintenance actions for one aircraft, where
each one of the plurality of scheduled maintenance actions includes at least an action description, an interval unit, an interval range, and a plurality of counts;
identifying, if any, at least one scheduled maintenance action due at the present time as a function of at least one of the plurality of counts;
generating command data representative of a command to disable functionality of at least one aircraft system in response to the identification of the at least one scheduled maintenance action;
providing the command data to the at least one aircraft system, such that the functionality of the at least one aircraft system is disabled upon receiving the command data;
generating an image data set as a function of at least one identified scheduled maintenance action, where
one page image of the at least one page image is formatted to present at least one maintenance strip divided into a plurality of strip areas for each one identified maintenance action, where
a first strip area is formatted to present the action description of an identified scheduled maintenance action,
a second strip area is formatted to present one of the plurality of counts of an identified scheduled maintenance action, and
a third strip area formatted to present a graphical user interface (GUI), where the GUI is presented in response to the command data being generated; and
providing the image data set to a display unit, whereby
at least one page image represented in the image data set is presented to a viewer.

16. The method of claim 15, wherein each one of the at least one scheduled maintenance action due at the present time is a scheduled maintenance action having a pre-flight court equal to or less than zero.

17. The method of claim 15, further comprising:
acquiring flight plan data representative of a plurality of flight plan counts; and
determining one post-flight count for each one of the plurality of scheduled maintenance actions, such that
the function for identifying at least one scheduled maintenance action due at the present time includes at least one post-flight count, and
the second strip area is further formatted to present one of the plurality of flight plan counts and the post-flight count of the identified scheduled maintenance action.

18. The method of claim 17, wherein
the at least one scheduled maintenance action due at the present time is the at least one first scheduled maintenance action due at the present time,
one identified scheduled maintenance action is one first identified scheduled maintenance action, and
the one page image of the at least one page image is a first page image of the at least one page image, and further comprising:
identifying, if any, at least one second scheduled maintenance action due at a time different from the present time and falling within its interval range, such that
the function for generating the image data set includes the at least one second identified scheduled maintenance action; and
identifying, if any, at least one third scheduled maintenance action due at a time different from the present time and falling outside of its interval range, such that
the function for generating the image data set includes the at least one third identified scheduled maintenance action, such that
a second page image of the plurality of page images is formatted to present at least one maintenance strip divided into a plurality of strip areas for each one second identified scheduled maintenance action, where
a fourth strip area is formatted to present the action description of an second identified scheduled maintenance action, and
a fifth strip area is formatted to present one of the plurality of counts represented in the maintenance data, one of the plurality of flight plan counts, and the post-flight count of a second identified scheduled maintenance action, and
a third page image of the plurality of page images is formatted to present at least one maintenance strip divided into a plurality of strip areas for each one third identified scheduled maintenance action, where
a sixth strip area is formatted to present the action description of a third identified scheduled maintenance action, and
a seventh strip area is formatted to present one of the plurality of counts represented in the maintenance data, one of the plurality of flight plan counts, and the post-flight count of a third identified scheduled maintenance action.

19. The method of claim 18, wherein
each one of the at least one second scheduled maintenance action is a scheduled maintenance action having a post-flight court greater than zero, and
each one of the at least one third scheduled maintenance action is a scheduled maintenance action having a post-flight court greater than zero.

20. The method of claim 15, wherein
the maintenance data is further representative of at least one unscheduled maintenance action that includes at least an action description and an outstanding count, such that
the function for generating the image data set includes the at least one unscheduled maintenance action, such that
a second page image of the plurality of page images is formatted to present at least one maintenance strip divided into a plurality of strip areas for each one unscheduled maintenance action, where a fourth strip area is formatted to present the action description of the unscheduled maintenance action, and a fifth strip area is formatted to present at least the outstanding count.

* * * * *